US009615222B2

(12) United States Patent
Wen (10) Patent No.: US 9,615,222 B2
(45) Date of Patent: Apr. 4, 2017

(54) SYSTEM AND METHOD FOR SIMPLIFYING MOBILE DEVICE ACCOUNT CREATION AND VERIFICATION

(71) Applicant: GTA Wireless Direct Ltd., Richmond Hill (CA)

(72) Inventor: Lijin "Michael" Wen, Richmond Hill (CA)

(73) Assignee: GTA Wireless Direct Ltd., Richmond Hill, Ontario (CA)

( * ) Notice: Subject to any disclaimer, the term of this patent is extended or adjusted under 35 U.S.C. 154(b) by 0 days.

(21) Appl. No.: 14/448,288

(22) Filed: Jul. 31, 2014

(65) Prior Publication Data
US 2015/0038131 A1 Feb. 5, 2015

Related U.S. Application Data

(60) Provisional application No. 61/958,660, filed on Aug. 5, 2013.

(51) Int. Cl.
| | | |
|---|---|---|
| *H04M 3/00* | (2006.01) |
| *H04W 4/12* | (2009.01) |
| *H04W 12/06* | (2009.01) |
| *H04L 29/06* | (2006.01) |
| *H04W 4/14* | (2009.01) |
| *H04W 4/00* | (2009.01) |

(52) U.S. Cl.
CPC ........... *H04W 4/12* (2013.01); *H04L 63/0807* (2013.01); *H04W 12/06* (2013.01); *H04W 4/001* (2013.01); *H04W 4/14* (2013.01)

(58) Field of Classification Search
CPC ........... H04W 4/12; H04W 4/14; H04W 4/18; H04W 4/003; H04W 4/055; H04W 12/06; H04W 12/001; H04W 4/001; H04L 63/0807
USPC .................................................. 455/418, 466
See application file for complete search history.

(56) References Cited

U.S. PATENT DOCUMENTS

| | | | |
|---|---|---|---|
| 8,649,768 B1 * | 2/2014 | Gaddam | H04W 12/06 455/411 |
| 2002/0147926 A1 * | 10/2002 | Pecen et al. | 713/201 |
| 2003/0061512 A1 * | 3/2003 | Flurry et al. | 713/201 |
| 2005/0027835 A1 * | 2/2005 | Raikar | H04L 63/20 709/222 |
| 2007/0073878 A1 * | 3/2007 | Issa | 709/225 |
| 2011/0249079 A1 * | 10/2011 | Santamaria et al. | 348/14.02 |
| 2012/0264427 A1 * | 10/2012 | Adatia | H04W 4/14 455/435.1 |
| 2013/0346189 A1 * | 12/2013 | Isaacs | G06Q 30/0255 705/14.45 |
| 2014/0023183 A1 * | 1/2014 | Brown et al. | 379/93.17 |
| 2014/0269366 A1 * | 9/2014 | Torgersrud et al. | 370/252 |

* cited by examiner

*Primary Examiner* — Amancio Gonzalez
(74) *Attorney, Agent, or Firm* — White and Williams LLP (57) ABSTRACT

A method is provided for establishing a verified user account record for a user using a device. A text message is received on the user's device addressed by phone number. The text message includes a custom URL. When the user actuates the custom URL from the device, a session is established of a dedicated web page on the user's browser, and the Device ID of the device is passed together with the phone number for storage in a non-transitory record associated with the user.

13 Claims, 6 Drawing Sheets

| User | UniKey | Status | Phone Number | Verified | deviceID | PushToken | Created |
|---|---|---|---|---|---|---|---|
| User1 | Sw4HH Q6Y0L | 1 | 13236506693 | 1 | 00000000-469a-efe0-Q95-55a6003c587 | APA91bF7ZULY88WD8R8F-R7zyu5 2AcJmoedgM8cK8VMR3R66xpeE5 GDyrBgyUrVM2LSP1X&42KWM6Au 8uCL3XgMUpsKpgC1sfBgCaRzsvV 0eM9DDnxd.P_s9k3CQVUfs-l68WYr DWhrOa-Lsgcrzj_qbAd8HFLof185p | 7/11/2013 2:00:26 |
| User2 | SxttKs2 cA06 | 1 | 30240558421 | 1 | 00000000-1cb0-88e5-fff- fffac77aeec | APA91bE.L6h3Gq7srlmsWD- mMcAJsyKsrDAGh04WyrtHe3vFGT b_1NUQSXgwsT9xd8PyryXCbpAws gC4gXK1R3eoxQY- iXmKsU7hZnW7mHnmK_EHT3Fh av419U8_MI9TxuLA- 89gwWT_gM0ACpAFz- 20ryXDY9jpA | 7/13/2013 1:16:28 |
| User3 | 5A0Ks 2CA8D | 1 | 646P5884421 | 1 | 00000000-4qg9-44e6-g8g8- fffac77atxCe | APA6tbEUtb3Gq7srlmsWD- mMcAJsyKsrDAGh04WyrtHe3vFGT b_1NUQSXgwsT9xd8PyryXCbpAws gC4gXK1R3eoxQY- iXmKsU7hZnW7mHaaH_EHT3Fha w419U8_MI9TxuLA- 89gwWT_gM0ACpAFz- 3SryXDY9jp8 | 7/15/2013 5:38:01 |

FIG. 6

SYSTEM AND METHOD FOR SIMPLIFYING MOBILE DEVICE ACCOUNT CREATION AND VERIFICATION

CROSS-REFERENCE TO RELATED APPLICATIONS

This application claims the benefit of U.S. Provisional Patent Application No. 61/958,660. filed Aug. 5, 2013. and entitled "System and Method for Simplifying Mobile Device Account Creation and Verification," which is incorporated herein by reference in its entirety.

FIELD OF INVENTION

The field of invention is generally related to mobile devices and more particularly relates to improved account creation and verification for mobile device users, particularly for communications.

BACKGROUND

Mobile devices have become an essential and inseparable part of the lifestyle. People use these devices for personal communications as well as for office communications, often carrying two or more separate devices e.g. a Smartphone and a tablet. Existing mobile devices e.g. phones, Smartphones, tablets and the like, have a multitude of functions that provide connectivity and communications services to a user. These devices are becoming increasingly smaller and more powerful and are used for making phone calls, checking e-mail, getting directions, playing games, searching the web, searching for places of interest on a map, amongst a host of other things.

In the past several years IP-based communication technology and end user devices have evolved to enable many different communication possibilities thus introducing several new services. As an example SMS has evolved from short text string messages that were limited in size to messaging services that enable the delivery of multimedia content without any restrictions on size or type of content.

Devices, mobile or otherwise, are often also used for messaging. Different messaging applications exist that provide mechanisms for messaging. Some examples are Yahoo Messenger, Skype, MSN, Viber, BBM (Blackberry Messenger), FaceTime, Whatsapp, etc.

Instant Messaging provides instant communication with another individual or group of individuals utilizing the Internet as a medium between two or more devices that are connected to the internet. Such devices may include Smartphones, tablets, desktop PC, a laptop, a simplified PC for Internet connectivity, SmartTV, etc. When a user is utilizing an Instant Messaging application, it may include other areas for messaging like a dialog box and a buddy list that shows a user-created collection of possible instant messaging recipients that are using the same application and have added the user in their list of buddies.

A buddy list allows a user to keep a track of possible Instant Messaging recipients who are online, thus letting the user know when her buddies come online or go offline. When a user wishes to send an Instant Message to someone on a buddy list, the user selects the desired address from the buddy list and enters a message into a dialog box. When the user presses the send button, a window immediately opens on the screen of the recipient with the Instant Message. The recipient can then respond by entering a message into the dialog box and pressing send. This continues as long as both individuals wish to have a conversation. Prior art instant messaging applications only allow individuals using the same application to be included on a buddy list. Additionally messaging is also limited with respect to both parties having to have the same application installed on their respective devices.

There are a number of shortcomings and limitations in the prior art of messaging and user verification. For example, a user must setup an account with the messaging service, which requires that a user choose a user name, a password, provide the phone number of their mobile phone etc. Additionally, each time the messaging service is used, the user must log into the messaging service to send a message to another user. This is also true in respect of other services where user verification may be required (e.g. e-commerce applications and services, online music, video, or gaming applications and services, newspaper and magazine subscription services, etc.).

Thus users must take multiple steps to setup an account, in order to send and receive messages or receive services. By overcoming these limitations of the prior art, the present invention seeks to make messaging and other applications requiring account setup and verification more accessible and convenient for users without compromising security and privacy.

SUMMARY

Broadly stated, the present invention provides a simplified system and method for user account creation and verification. In one aspect, the system and method allows for messaging without requiring a user to setup a user account. The system and method leverages existing communications patterns and semi-trusted relationships between users to form the basis for account information and allowing it to be verified.

In one preferred embodiment, a method is provided whereby an application (app) may be installed on a first device and the app is able to send a message and receive a response from a second device such that neither user requires an account setup with the messaging service. The app permits a first device to establish a 2-way communications with a second device assisted by a server.

The system is able to gather information about a user from different sources as the user communicates with and messages other users. Over time, the system builds a data record for each user, gathering pieces of information as they become available via the interaction of different users.

In one embodiment, once the 2-way communication session has been established between the first device and a second device, the content that may be exchanged between the devices may preferably be text, picture, audio, video, hypertext, GPS location, or any other kind of digital content that can be shared or exchanged. In a variation of an embodiment, the content that is exchanged between the first device and the second device may be encrypted; the encryption may be either on the server side or the client side.

Devices that can advantageously make use of the system may include but are not limited to a Smartphone, a feature phone that supports messaging or any device that has a phone number associated with it.

In another embodiment there may be more than two participants in this communication session. Thus the present system and method can be used for one-to-one communications as well as can be used for one-to-many communications.

Other embodiments may be applicable to all mobile applications in addition to messaging apps.

According to a first aspect, a method is provided for establishing a verified user account record for a user using a device. A text message addressed by phone number is received on the user's device. The text message includes a custom URL. When the user actuates the custom URL from the device, a session is established of a dedicated web page on the user's browser. The Device ID of the device is passed together with the phone number for storage in a non-transitory record associated with the user.

Preferably, the phone number was obtained automatically from a message previously sent by or from the user. For example, the phone number may be obtained by pattern matching having regard to previous SMS (or instant) messages to and from the device.

In one embodiment, a push token is generated or detected that is associated with the device, and this can be stored together with the Device ID and phone number in the record.

Preferably, the record is available for lookup by an application requiring verification of the user or the user's device. In one embodiment, the record is available for lookup by an application requiring verification of the user or the user's device as recipient of a secure message.

The text message may be SMS.

The phone number may be incorporated in the custom URL.

In one embodiment, actuating the custom URL associates the custom URL with a permanent token embodied in an HTTP cookie stored on the user's device.

In one embodiment, an application programmed for messages to be communicated from the user to other users is first installed on the user's device. For each message sent to a new user (i.e. a user not previously verified or messaged using the application), a new user record is preferably created.

The application is preferably further programmed for obtaining a custom URL in the course of sending the message to the new user. Preferably, the custom URL includes a UniKey or Token unique to the user.

The application may allow the user to send an instant message to another user via the application irrespective of the other user's installed applications or online status. Such an instant message may include at least one of: a text component, a picture component, an audio component, a video component, a hypertext component, a multimedia component, and a GPS location component. The instant message may be encrypted. Preferably, the contents of the instant message are not part of the text message.

DETAILED DESCRIPTION

Before embodiments are explained in detail, it is to be understood that the invention is not limited in its application to the details of the examples set forth in the following descriptions or illustrated drawings. The invention is capable of other embodiments and of being practiced or carried out for a variety of applications and in various ways. Also, it is to be understood that the phraseology and terminology used herein is for the purpose of description and should not be regarded as limiting.

Before embodiments of the software modules or flow charts are described in detail, it should be noted that the invention is not limited to any particular software language described or implied in the figures and that a variety of alternative software languages may be used for implementation of the invention.

It should also be understood that many components and items are illustrated and described as if they were hardware elements. However, in at least one embodiment, the components comprised in the method and tool are actually implemented in software.

The present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. Computer code may also be written in dynamic programming languages that describe a class of high-level programming languages that execute at runtime many common behaviours that other programming languages might perform during compilation. JavaScript, PHP, Perl, Python and Ruby are examples of dynamic languages. Additionally computer code may also be written using a web programming stack of software, which may mainly be comprised of open source software, usually containing an operating system, Web server, database server, and programming language. LAMP (Linux, Apache, MySQL and PHP) is an example of a well-known open-source Web development platform. Other examples of environments and frameworks using which computer code may also be generated are Ruby on Rails which is based on the Ruby programming language, or node.js which is an event-driven server-side JavaScript environment.

The invention may also be implemented as a SaaS (Software As A Service) architecture using any variation and combination of cloud technologies and services being provided by companies like Amazon, Google, Microsoft etc.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The code is specialized to execute functions described herein which enable a smoother and more efficient technological process.

A device that enables a user to engage with an application according to the present system and method, including a memory for storing a control program and data, and a processor (CPU) for executing the control program and for managing the data, which includes user data resident in the memory and includes buffered content. The computer may be coupled to a video display such as a television, monitor, or other type of visual display while other devices may have it incorporated in them (iPad). An application or a game or other simulation may be stored on a storage media such as a DVD, a CD, flash memory, USB memory or other type of memory media or it may be downloaded from the internet. The storage media can be inserted to the console where it is read. The console can then read program instructions stored on the storage media and present a user interface to the user.

Figure 1:
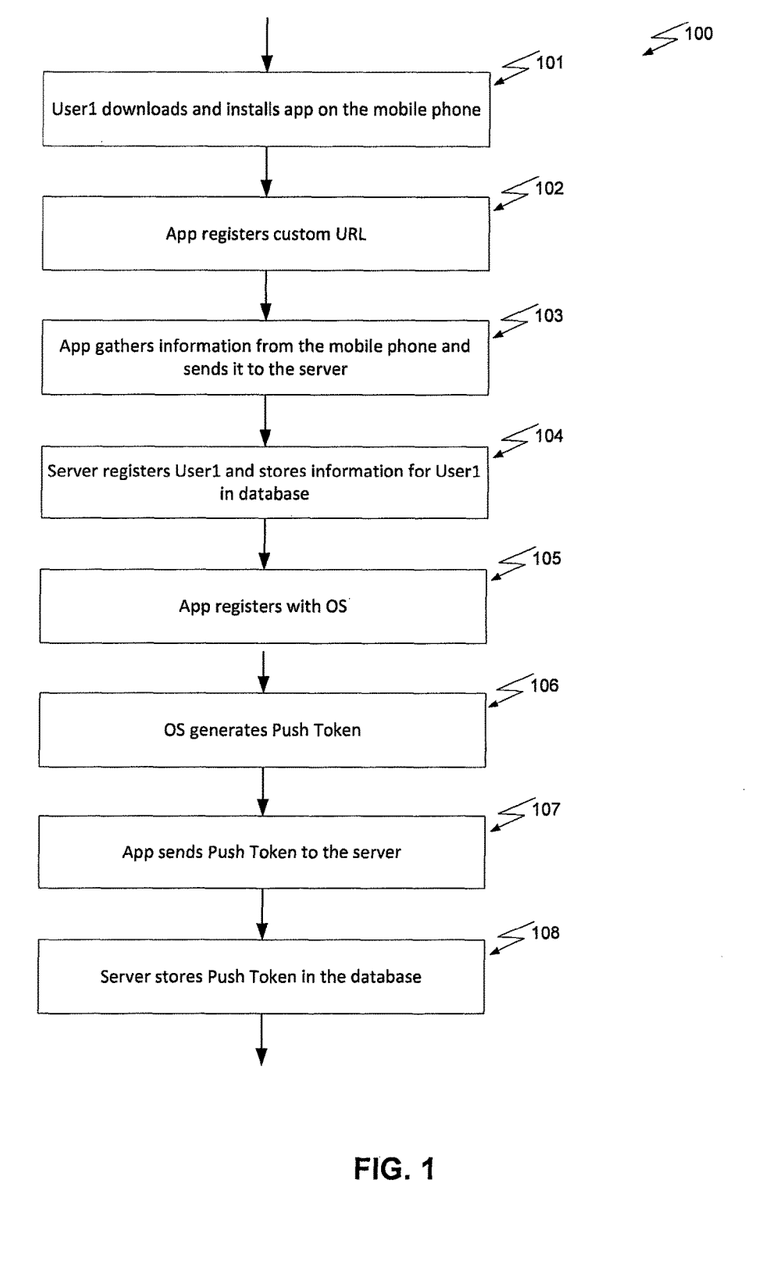
FIG. 1 is a flow diagram of the start of a process for establishing a record for a user of a mobile device who has downloaded a messaging app, according to the present system and method.

Turning now to FIG. 1, a system is provided for messaging for devices (mobile or otherwise) whereby using an installed app User1 can send a message to User2 using only User2's phone number. Neither user has to setup an account and register. User1 downloads and installs the application on a first device a mobile phone 101. One version of such a communication application and method and system is described in applicant's co-pending application U.S. Ser. No. 14/306,644 filed Jun. 17, 2014, the disclosure of which is incorporated herein by reference.

In the preferred embodiment, the system and method may be implemented on a mobile device like a Smartphone, a tablet, a computer, a laptop a SmartTV or the like. Devices where the invention can be advantageously implemented may include but are not limited to an iPhone, iPad, Smartphones, Android phones, personal computers e.g. laptops, tablet computers, touch-screen computers running any number of different operating systems e.g. MS Windows, Apple iOS, Linux, Ubuntu, etc. or any other device where an internet connection can be supported using technologies like 3G, 4G, LTE, WiFi, Bluetooth, NFC etc.

In some embodiments, the device is portable. In some embodiments, the device has a touch-sensitive display with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include providing maps and directions, telephoning, video conferencing, e-mailing, instant messaging, blogging, digital photographing, digital videoing, web browsing, digital music playing, and/or digital video playing. Instructions for performing these functions may be included in a computer readable storage medium or other computer program product configured for execution by one or more processors.

The application may have more than one version. Each particular version may be intended for a particular operating system. For example, there may be a version of the application for iOS that can be installed on iPhone and iPad, while there is another version of the application that can be installed on an Android device. The first device and the second device may have the same operating system e.g. the first device is an iPhone while the second device is an iPad or the first device and the second device may have different operating systems e.g. the first device is an Android phone while the second device is a laptop running Microsoft Windows 7.

To begin, the app registers a custom URL 102. A URL is an address for a website. An example of a custom URL is given below:

24sms://AbC1234XyZ
azf://123DeFg456

A few examples of regular URLs are given below for comparison:

http://www.apple.com
http://www.youtube.com
https://www.google.com
mail://support@24sms.net In the custom URL, the first portion is the scheme name (e.g. 24sms://, in the above). The second portion is the UniKey or Token. This UniKey or Token is generated by the server and is unique for each user. The scheme name will generally stay the same across different users within the same application. The scheme name and UniKey/Token are combined to create the custom URL.

The app gathers information from the mobile device and sends it to the server 103. The information includes the DeviceID of the mobile device. For present purposes, a server is a computing device that is connected to the internet or other network and is capable of providing a communication service to devices and applications that connect to it via the network. The server stores a program executable by a computer included in a server, the executable program manages the database of users, and inter-user communications and other functions and routines necessary to execute the functionality of the invention.

A server comprises a central processing unit (CPU), a memory, and input/output (I/O) equipment, which are connected by a bus inside. Through north bridge chips, the CPU and the memory are connected, and through south bridge chips, the I/O dock is connected.

Here, the server registers User1 and saves the User1 information in the database 104.

The app registers with the OS 105. The OS generates a Push Token 106. The app sends the Push Token to the server 107. The server stores the Push Token in the database 108. This process will occur in any OS.

Figure 2:
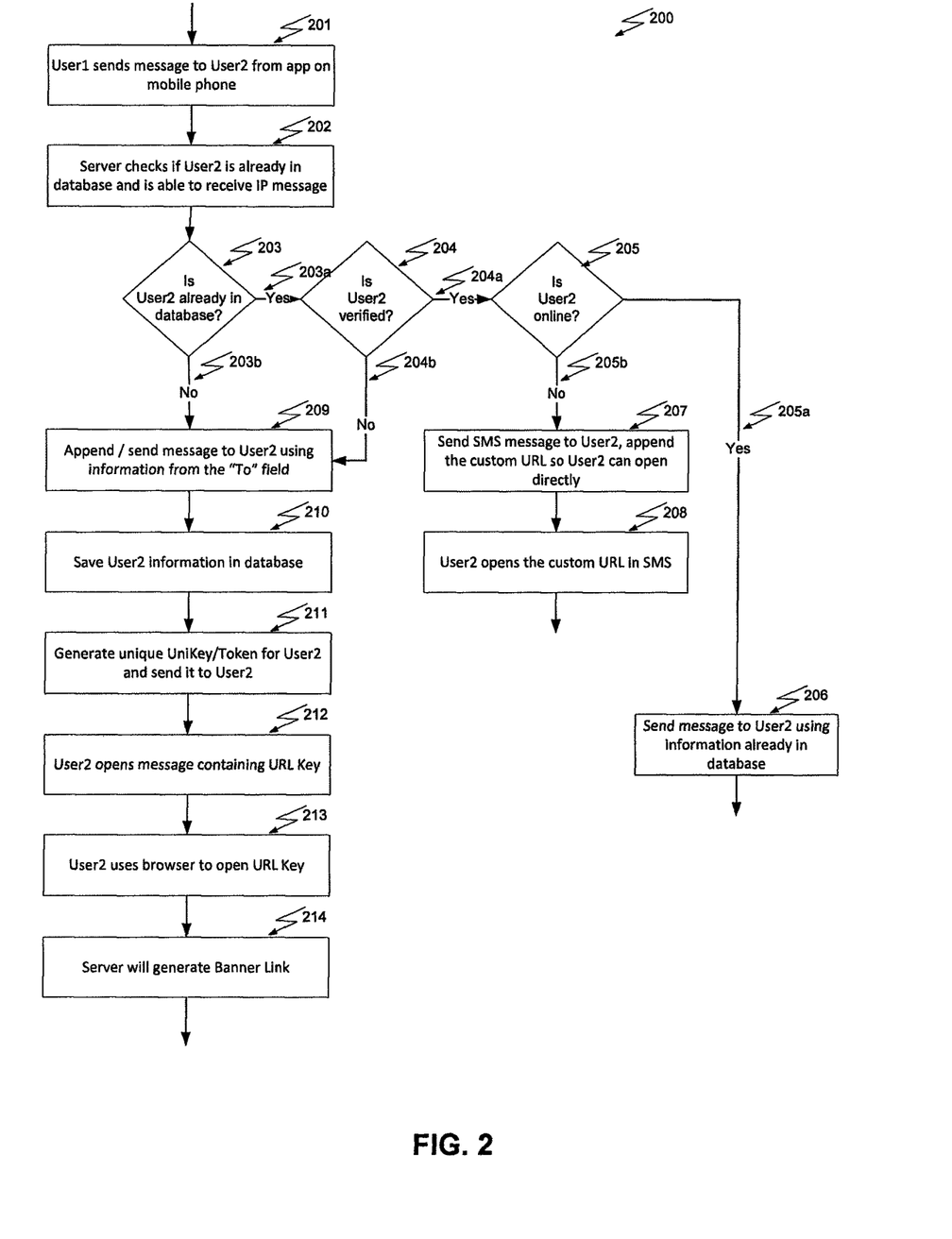
FIG. 2 is a flow diagram of one embodiment of a process for creating a message to be sent from User1 to User2 and creation of a database record for User2 as necessary.

FIG. 2 shows one embodiment of the invention. User1 sends a message to User2 from an app on User1's mobile phone 201.

The server checks if User2 is already in database and is able to receive an IP message 102. The server checks whether User2 is already in the database 203. If Yes 203a, User2 is already in database and can receive an IP message, the system checks if User2 is already verified 204. If Yes 204a, User2 is already verified, the system checks if User2 is online 205. If Yes 205a, User2 is online, then the system sends a message to User2 using information already in the database.

Push notification allows an app to notify a user of new messages or events without the need to actually open the application, similar to how a text message will make a sound and pop up on a mobile device screen. It presents a way for apps to interact with users while remaining in the background. Push notifications are widely used by a variety of apps including games to notify users of a message or a notification that an event is occurring in the app or for example iPad's mail application beeping as a new message appears in the inbox.

If No 205b, User2 is not online, then the system sends an SMS message to User2 appending the custom URL so User2 can open it directly 207. User2 opens the custom URL in SMS 208.

The term text messaging also known as "SMS" stands for short message service which is a text messaging service component of phone, web, or mobile communication systems, using standardized communications protocols that allow the exchange of short text messages between fixed line or mobile phone devices.

SMS is a method of communication that sends text between mobile phones, or from a PC or handheld to a mobile phone. The "short" part refers to the maximum size of the text messages: in GSM 160characters (letters, numbers or symbols in the Latin alphabet); in CDMA 140. characters; and for other languages that require double-byte alphabets, such as Chinese, the maximum SMS size is 70characters.

If Yes 203a, User2 is already in the database and No 204b, User2 is not verified, the system sends a message to User2 using information from the "To" field of the message 209. The message appends the custom URL.

Similarly if No 203b, User2 is not already in the database, the system sends a message to User2 using information from the "To" field of the message 209. The message appends the custom URL.

The system saves User2's information in the database 210 e.g. User2 phone number from the "To" field of the message. A unique URL Key (i.e. the custom URL) is generated for User2 and sent to User2 211. In one embodiment, it may be a new message while in another embodiment it may be appended to the SMS message.

User2 opens message containing URL Key 212. User2 uses browser to open URL Key 213.

A computer executing a browser, also referred to as a Web Client or client, is essentially a hyper text reader communicating with a Web Server via a specific data transfer protocol such as a Hyper Text Transfer Protocol (HTTP). Any hyper text file on the web is uniquely identified by its Universal Resource Locator (URL). Many of the hyper text files are structured using the Hyper Text Mark-up Language (HTML) which may also be used for calling hyper text data objects. A hyper text data object may be in the form of any information medium including a text, an image, a voice, a moving picture or an executable computer program. When a client requests a hyper text file, using the file's URL, the file is displayed on the client's browser, where the display is commonly known as a web page. The client can return data to the server and call a Common Gateway Interface (CGI) program on the server computer to perform a specific task.

If the identity of the client is not needed, an HTTP server will serve content to any client which requests a page. Such a solution is only practical where the content is public and the author of the content may not want to place any restrictions on who may view the page. If the author of the linked-to page wants to place restrictions, the client will have to enter into a session with the server where the client is first authenticated prior to the server allowing access to the server.

Since HTTP is stateless and since Web servers are accessible by many users, where each user may interact with the Web server in a different way, a technique had to be developed in a way to track the states of the connecting users. Instead of requesting each user to authenticate upon each click in a Web application, a session token is created on the client's browser, where the session token is used to identify the user. Thus a session token is a unique identifier that is generated and sent from a server to a client to identify the current interaction session. The client usually stores and sends the token as an HTTP cookie and/or sends it as a parameter in GET or POST queries. The reason to use session tokens is that the client only has to handle the identifier—all session data is stored on the server (usually in a database, to which the client does not have direct access) linked to that identifier.

Usually the session token is kept "alive" in the browser as long as the user is logged on to the Web server. In some cases the session token may be deleted when the user logs-out from the Web Server or after a predefined period of inactivity. Typically session tokens are commonly stored in cookies, URLs and hidden fields of Web pages.

Devices that can benefit from the present system may include but are not limited to a computer, a server, network appliance, set-top box, SmartTV, embedded device, computer expansion module, personal computer, laptop, tablet computer, personal data assistant, game device, e-reader, a mobile device for example a Smartphone, any appliance having internet or wireless connectivity.

Once a 2-way communication session has been established between User1 and User2, the users can share any kind of content such as text, hypertext, audio, video, data, or anything in a digital format. The content may be unencrypted or encrypted either at the server-side or at the client-side. Such messaging may preferably be used with any kind of environment be it related to work, home, business or other.

Server will generate a banner link 214. In one embodiment the server will generate a banner according to mobile device operating system. For mobile device running the iOS a smart banner will be generated while for other operating systems a different kind of banner will be generated.

A cookie, also known as an HTTP cookie, web cookie, or browser cookie, is a small piece of data sent from a web server (website) and stored in a user's web browser while a user is browsing a website. When the user browses the same website in the future, the data stored in the cookie is sent back to the web server by the browser to notify the web server of the user's previous activity.

Cookies were designed to be a reliable mechanism for web servers to remember the state of the website or activity the user had taken in the past. This can include clicking particular buttons, logging in, or a record of which pages were visited by the user even months or years ago.

When a user accesses a website with a cookie function for the first time, a cookie is sent from server to the browser and stored with the browser in the local computer. Later when that user goes back to the same website, the web server will recognize the user because of the stored cookie with the user's information.

A session identifier, session ID or session token is a piece of data that is used in network communications (often over HTTP) to identify a session. A session is a series of related message exchanges. Session identifiers become necessary in cases where the communications infrastructure uses a stateless protocol such as HTTP.

For example, a buyer who visits a seller's site wants to collect a number of articles in a virtual shopping cart and then finalize the shopping by going to the site's checkout page. This typically involves an ongoing communication where several webpages are requested by the client and sent back to them by the server. In such a situation, it is vital to keep track of the current state of the shopper's cart, and a session ID is one way to achieve that goal.

A session ID is typically granted to a visitor on his first visit to a site. It is different from a user ID in that sessions are typically short-lived (they expire after a preset time of inactivity which may be minutes or hours) and may become invalid after a certain goal has been met for example, once the buyer has finalized his order, he cannot use the same session ID to add more items.

A session ID is often a long, randomly generated string to decrease the probability of obtaining a valid one by means of a brute-force search. Many servers perform additional verification of the client, to prevent an attacker from obtaining a session ID. Locking a session ID to the client's IP address is a simple and effective measure as long as the attacker cannot connect to the server from the same address.

A session token is a unique identifier, usually in the form of a hash generated by a hash function that is generated and sent from a server to a client to identify the current interaction session. The client usually stores and sends the token as an HTTP cookie and/or sends it as a parameter in GET or POST queries. The reason to use session tokens is that the client only has to handle the identifier (a small piece of data which is otherwise meaningless and thus presents no security risk)—all session data is stored on the server (usually in a database, to which the client does not have direct access) linked to that identifier.

Figure 3:
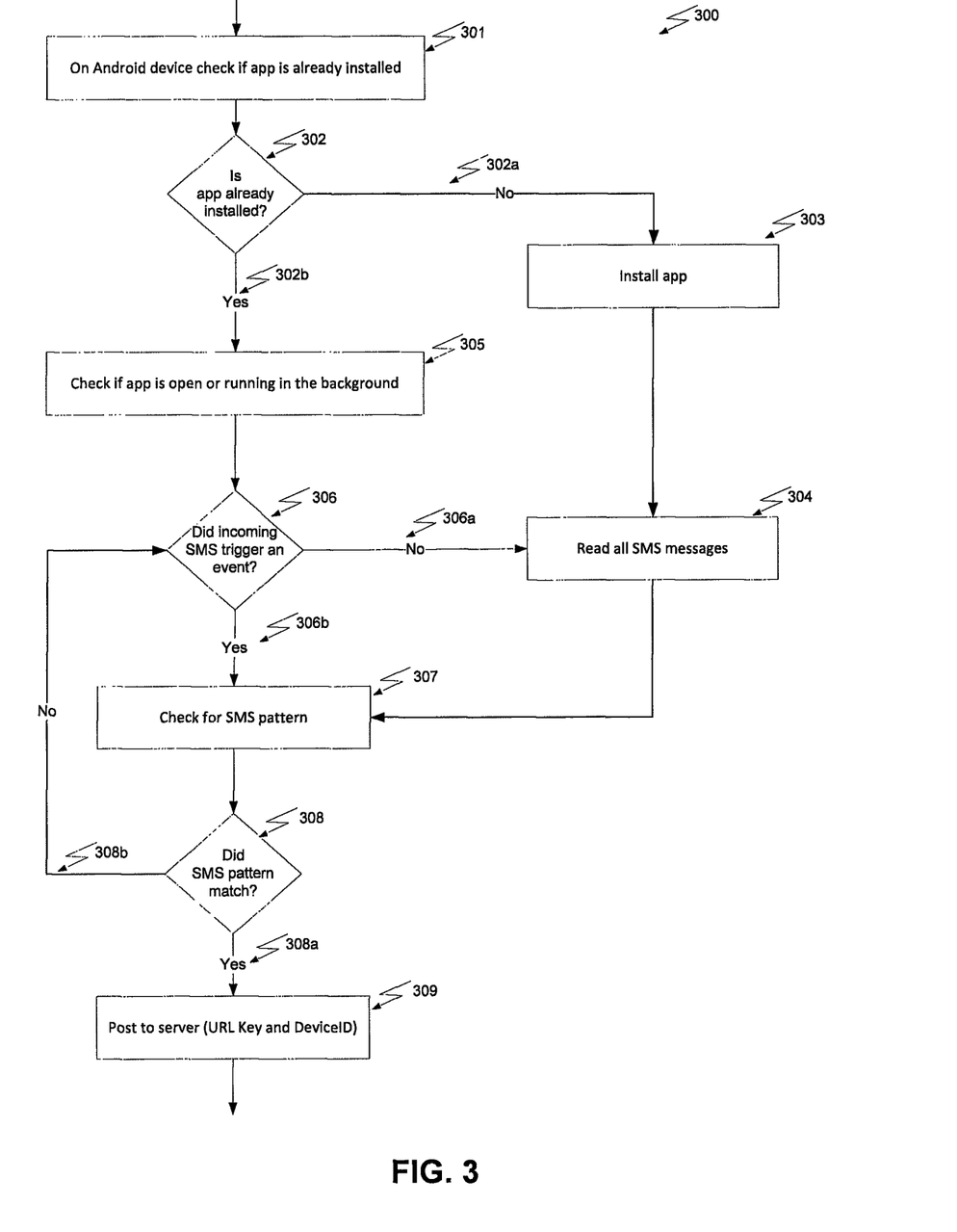
FIG. 3 is a flow diagram of a sample process for record creation (and/or updating) as triggered by incoming SMS on an Android device.

FIG. 3 shows an exemplary scenario describing the steps for the Google Android operating system 300. The system checks on Android device if the app is already installed 301. Is app already installed 302? If No 302a, the app is not installed on the Android device, the system installs the app 303. The system reads the previous SMS messages that are in the device 304.

Each SMS is checked for a SMS pattern 307. The pattern matching is used to find the custom URL (or URL Key) that was sent by the server to the user. From the custom URL (URL Key), the token is checked to verify the user. Did SMS pattern match 308? If Yes 308a, the SMS pattern matches, then the system posts to the server (URL Key and DeviceID) 309.

If Yes 302b, the app is already installed on the Android device, then the system checks if the app is open or running in the background 305.

Did incoming SMS trigger an event 306? If No 306a, there was no incoming SMS and no event was triggered, then the system reads the previous SMS messages 304 and checks for pattern match 307. The event in this case is the arrival of the SMS. The event notification is generated by the OS and intercepted. Thus, when the SMS is fresh, there is an event. It is at this point that the system checks the latest SMS for a pattern to find the URL Key. If there is no recent event (i.e. all SMS have been read), then the system checks all SMS to look for the pattern seeking the URL Key.

If Yes 306b, there was an incoming SMS that triggered an event, the system checks the incoming SMS message for a pattern match 307. Did SMS pattern match 308? If Yes 308a, the SMS pattern matches, then the system posts to the server (URL Key and DeviceID) 309.

If No 308b, the SMS pattern did not match, then the system continues to listen for incoming SMS messages 306, and continues the loop until the next SMS is received.

Figure 4:
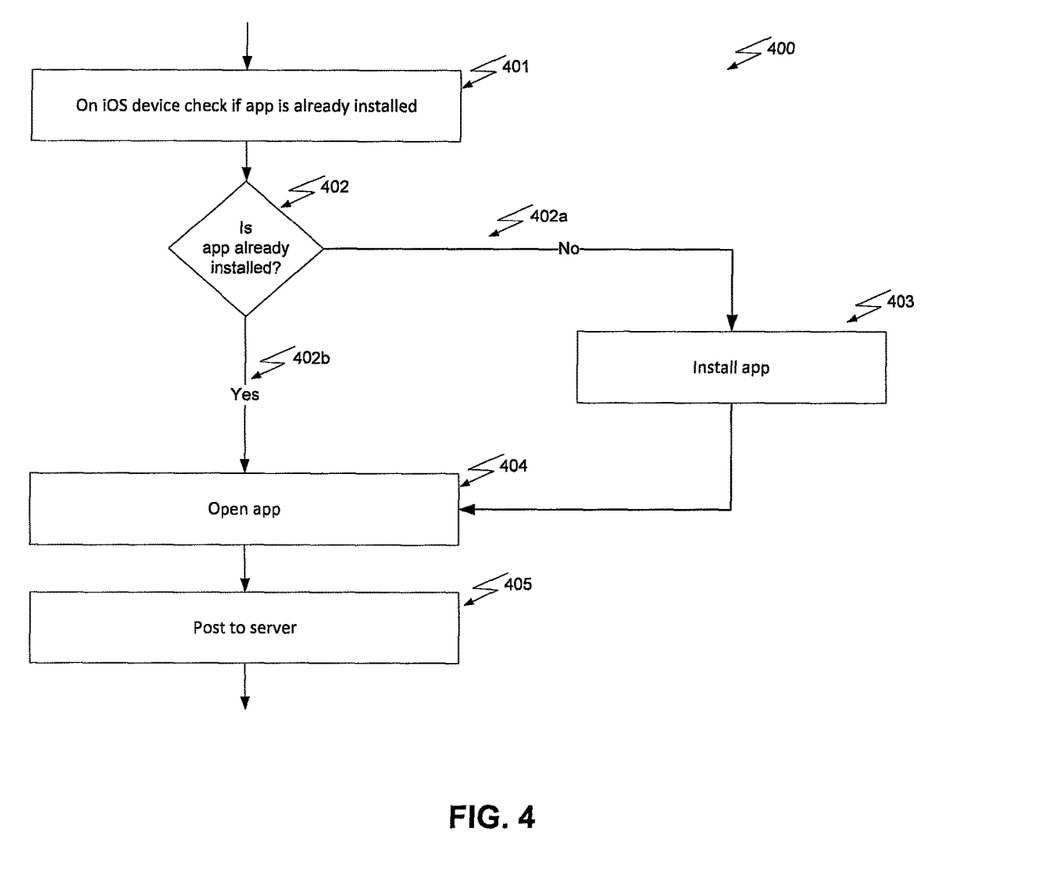
FIG. 4 is a flow diagram of a sample process for record creation (and/or updating) on an iOS device.

FIG. 4 shows an alternate embodiment implemented on iOS 400. On an iOS mobile device, the system checks if the app is already installed 401.

Is app already installed 402? If No 402a, the app is not installed on the iOS device, then the system installs the app using Smart Banner 403. Once app is installed the system then opens the app 404. The system posts to server 405. In one embodiment, information posted to the server may include but is not limited to deviceID, pushToken and URLKey(URLToken). Note that the Smart Banner is used in iOS to pass the custom URL to the app which in turn posts it to the server. Thus, the system does not have to review existing SMS messages and perform the event-based analysis as per the process outlined with respect to FIG. 3.

If Yes 402b, the app is already installed on the iOS device, then the system opens the app using Smart Banner 404. The system posts to server 405.

Figure 5:
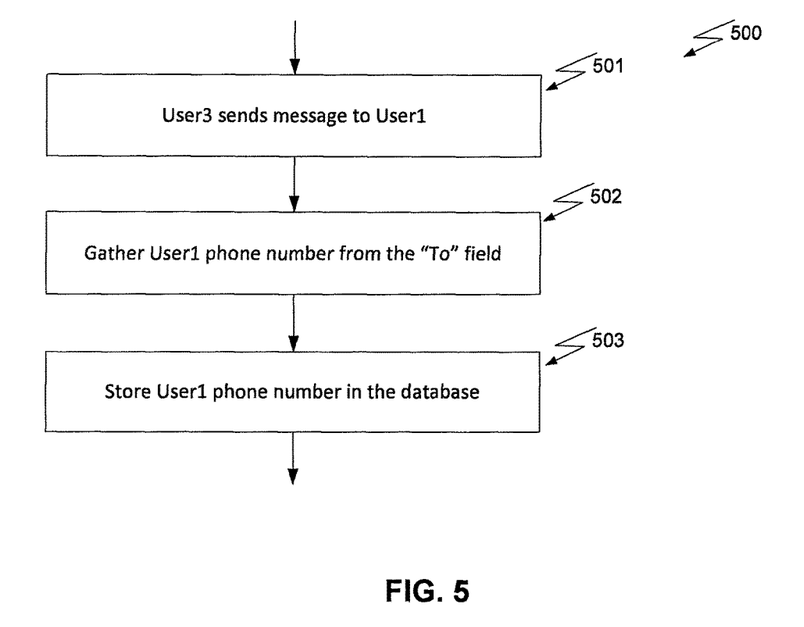
FIG. 5 is a flow diagram of a sample process for gathering record data from a message between User3 and User1.

FIG. 5 shows the steps 500 that User3 takes which in turn help complete the missing information about User1. User3 sends a message to User1 501. In the course of sending a message, the system gathers User1's phone number from the "to" field of the message 502.

User1's phone number is stored in the database 503. This information is used to send a message to User1.

In another embodiment, User1 may send a message to self, and in so doing the system gathers User1's phone number from the message.

Figure 6:
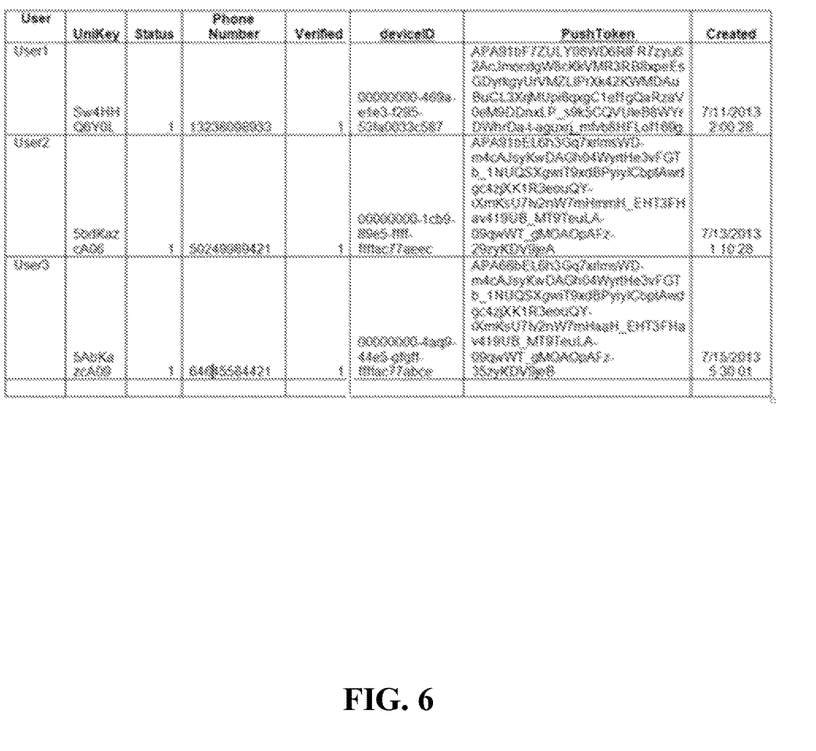
FIG. 6 is an exemplary database table showing records for several users.

FIG. 6 shows an exemplary database table where the different fields of information about each user have been saved. In the preferred embodiment, the system is able to gather information about a user from different sources as the user communicates and messages other users (or him/herself). Over time, the system builds a data record for each user, gathering pieces of information as they become available via the interaction of different users. Thus the items of information are gathered over a period of time from different sources and helps in the fact that the users do not have to register and provide this information at the time of registration. This information is gathered as different users interact with each other and the system.

Although the preferred embodiment describes a messaging app, the invention is not limited to messaging apps, but is applicable to any kind of a mobile app that may be installed on a mobile phone and may require user registration or verification. The system and process may be applicable for other kinds of apps that need to communicate with a unique user regarding a unique set of information. Examples may include tracking apps (e.g. FedEx, UPS, Amazon or Walmart) which alert the user of the status of an order or shipment. In these examples, a user would enter a phone number on the store website. The server would then create a token and send a custom URL to the user's phone. Using this custom URL, the user downloads the app, and starts to receive shipment notifications directly on the user's phone. Thus, the user does not need to create an account in order to receive shipment status information.

In another embodiment there may be more than two participants in this communication session. Thus the present system and method can be used for one-to-one communications as well as can be used for one-to-many communications.

In one embodiment once the 2-way communication session has been established between the first device that has an app and a second device that is using a browser, the content that is exchanged between the devices may preferably be text, picture, audio, video, hypertext, GPS location, or any other kind of digital content that can be shared or exchanged. In a variation of an embodiment the content that is exchanged between the first device and the second device may be encrypted; the encryption may be either on the server side or the client side.

It should be understood that although the term application has been used as an example in this disclosure but in essence the term may also imply to any other piece of software code where the embodiments are incorporated. The software application can be implemented in a standalone configuration or in combination with other software programs and is not limited to any particular operating system or programming paradigm described here.

The computer program comprises: a computer usable medium having computer usable program code, the computer usable program code comprises: computer usable program code for presenting graphically to the users options for a touch-screen interface.

Several exemplary embodiments/implementations have been included in this disclosure. The application is not limited to the cited examples, but the intent is to cover all such areas that may be benefit from the present system and method.

The device may include but not limited to a personal computer (PC), which may include but not limited to a home PC, corporate PC, a Server, a laptop, a Netbook, a Mac, a cellular phone, a Smartphone, a PDA, an iPhone, an iPad, an iPod, an iPad mini, a PVR, a settop box, wireless enabled Blu-ray player, a TV, a SmartTV, wireless enabled Internet radio, e-book readers e.g. Kindle or Kindle DX, Nook, etc. and other such devices that may connect to the internet etc. The first device and the second device may be running any number of different operating systems as diverse as Microsoft Windows family, MacOS, iOS, any variation of Google Android, BlackBerry RIM, any variation of Linux or Unix, PalmOS, Symbian OS, Ubuntu or such operating systems used for such devices available in the market today or the ones that will become available as a result of the advancements made in such industries.

The above examples are not intended to be limiting, but are illustrative and exemplary.

The examples noted here are for illustrative purposes only and may be extended to other implementation embodiments. While several embodiments are described, there is no intent to limit the disclosure to the embodiment(s) disclosed herein. On the contrary, the intent is to cover any and all practical alternatives, modifications, and equivalents.

What is claimed is:

1. A method of establishing a verified user account record for a user using a device comprising:
    sending from a server to the user's device a text message addressed by phone number, the text message including a custom URL generated by the server in concert with an application on the device, the custom URL incorporating a UniKey or Token; and
    enabling actuating the custom URL from the device to establish a session of a dedicated web page on the user's browser;
    determining whether the device is an Android device or an Apple device;
    if the device is an Android device, verifying the Device ID and phone number by pattern matching with previous text messages, independently of the device and user;
    if the device is an Apple device, verifying the Device ID and phone number by Smart Banner in iOS, independently of the device and user; and
    after the Device ID and phone number have been verified, passing the Device ID of the device together with the phone number from the application to the server for storage by the server in a non-transitory record associated with the user.

2. The method of claim 1, wherein the phone number was obtained automatically by the application from a message previously sent by or from the user.

3. The method of claim 1, further comprising the server receiving a push token by the application associated with the device for storage together with the Device ID and phone number in the record.

4. The method of claim 1, wherein the record is available for lookup by another application requiring verification of the user or the user's device.

5. The method of claim 1, wherein the record is available for lookup by another application requiring verification of the user or the user's device as recipient of a secure message.

6. The method of claim 1, wherein the text message is SMS.

7. The method of claim 1, wherein actuating the custom URL associates the custom URL with a permanent token embodied in an HTTP cookie stored on the user's device.

8. The method of claim 1, wherein the application is programmed for messages to be communicated from the user to other users, and wherein a message sent to a new user creates a record for the new user.

9. The method of claim 8, wherein the application is further programmed for obtaining a custom URL in the course of sending the message to the new user.

10. The method of claim 8, further comprising allowing the user to send an instant message to another user via the application irrespective of the other user's installed applications or online status.

11. The method of claim 10, wherein the instant message includes at least one of: a text component, a picture component, an audio component, a video component, a hypertext component, a multimedia component, and a GPS location component.

12. The method of claim 10, wherein the instant message is encrypted.

13. The method of claim 10, wherein the contents of the instant message are not part of the text message.

* * * * *